(12) United States Patent
Ruan et al.

(10) Patent No.: US 12,312,017 B2
(45) Date of Patent: May 27, 2025

(54) TIERING DEVICE FOR A FREIGHT COMPARTMENT

(71) Applicant: Zhejiang TOPSUN Logistic Control Co., Ltd., Yuhuan (CN)

(72) Inventors: Buqin Ruan, Yuhuan (CN); Zhaoyin Xiao, Yuhuan (CN); Zhengzhong Zhu, Yuhuan (CN); Xiaomin Chen, Yuhuan (CN)

(73) Assignee: Zhejiang TOPSUN Logistic Control Co., Ltd., Yuhuan (CN)

( * ) Notice: Subject to any disclaimer, the term of this patent is extended or adjusted under 35 U.S.C. 154(b) by 701 days.

(21) Appl. No.: 17/765,842

(22) PCT Filed: Dec. 24, 2020

(86) PCT No.: PCT/CN2020/139010
§ 371 (c)(1),
(2) Date: Apr. 1, 2022

(87) PCT Pub. No.: WO2021/139538
PCT Pub. Date: Jul. 15, 2021

(65) Prior Publication Data
US 2022/0402562 A1    Dec. 22, 2022

(30) Foreign Application Priority Data
Jan. 9, 2020    (CN) .......................... 202010021983.2

(51) Int. Cl.
*B62D 33/00*    (2006.01)
*B62D 33/04*    (2006.01)

(52) U.S. Cl.
CPC .................................. *B62D 33/042* (2013.01)

(58) Field of Classification Search
CPC .......... B61D 45/007; B60D 7/13; B60D 7/06; B60D 1/6418; B60D 33/042
USPC .............................................................. 410/52
See application file for complete search history.

(56) References Cited

FOREIGN PATENT DOCUMENTS

| CN | 101357608 B | 8/2010 |
|---|---|---|
| CN | 203020831 U | 6/2013 |
| CN | 206068404 U | 4/2016 |
| CN | 205440076 U | 8/2016 |

(Continued)

OTHER PUBLICATIONS

International Search Report of PCT/CN2020/139010.

*Primary Examiner* — Steven O Douglas
(74) *Attorney, Agent, or Firm* — Minder Law Group; Willy H. Wong

(57) ABSTRACT

The present invention provides a tiering device for a freight compartment, which pertains to the technical field of logistic and transportation equipment. It solves the problem in the prior art that existing tiering devices for a freight compartment occupy a relatively large space inside the freight compartment. The tiering device for a freight compartment according to the present invention comprises: a sidewall of the freight compartment, a transmission part, and a vertical guide track; the transmission part lift/lower support members, the support members forms placement area for goods. Half of the transmission part is buried inside a belt guide channel on the vertical guide track, the other half is located inside the vertical guide track or is flush with the groove opening of the vertical guide track. The present invention occupies less space inside the freight compartment, thus facilitating loading/unloading goods to/from the freight compartment.

13 Claims, 13 Drawing Sheets

(56) References Cited

FOREIGN PATENT DOCUMENTS

| CN | 206142278 U | 5/2017 |
|---|---|---|
| CN | 2071912087 U | 4/2018 |
| CN | 106364395 B | 3/2019 |
| CN | 109398507 A | 3/2019 |
| CN | 109447547 A | 3/2019 |
| CN | 110450862 A | 11/2019 |
| CN | 111098941 A | 5/2020 |

TIERING DEVICE FOR A FREIGHT COMPARTMENT

RELATED APPLICATIONS

This application claims priority to PCT Patent Application No. PCT/CN2020/139010 filed Dec. 24, 2020 and China Patent Application No. CN202010021983.2 filed Jan. 9, 2020.

The above applications and all patents, patent applications, articles, books, specifications, other publications, documents, and things referenced herein are hereby incorporated herein in their entirety for all purposes. To the extent of any inconsistency or conflict in the definition or use of a term between any of the incorporated publications, documents, or things and the text of the present document, the definition or use of the term in the present document shall prevail.

TECHNICAL FIELD

The present invention pertains to the technical field of logistic and transportation equipment, and relates to a tiering device for a freight compartment.

BACKGROUND

For transportation of goods in a freight compartment, in order to make efficient use of space inside the freight compartment, generally, a tiering device is set up in the freight compartment to enable placement of goods in a plurality of upper and lower tiers, thus avoiding space wastage.

Existing tiering devices for a freight compartment include a support-cross-beam type and a support-plate type, in terms of a support member used in the tiering device. For a support-cross-beam-type tiering device, its structure is as disclosed in Chinese Patent titled "Tiering Device for Freight compartment" (China Patent Application No.: 201220663809.9; Publication No.: CN203020831U), in which, in a process of tiering placement of goods, the device can adjust a plurality of support cross beams to the same height, allowing space below the plurality of support cross beams to be used for placement of goods and space above the plurality of support cross beams to also form a placement area for goods, and at the same time, allowing the plurality of support cross beams together to provide support for the goods, thus achieving tiering placement of goods in a freight compartment. So far, support-cross-beam-type tiering devices available on the market are generally designed to achieve adjustment of support height of the support cross beams by hand, which is disadvantageous for being laborious in operation.

In order to achieve automatic lifting and lowering of the support cross beams, the applicant previously proposed a drive of a tiering device for a freight compartment (China Patent Application No.: 201910555611.5; Publication No.: CN110316261A), in which lifting and lowering of the support cross beams is performed through rotation of a synchronous pulley driven by an electric motor; however, the synchronous belt included in the tiering device still occupies space inside the freight compartment and tends to affect loading/unloading goods to/from the freight compartment.

Due to thickness limitation on a sidewall of a freight compartment, all current tiering devices (such as a support cross beam or a support plate) that rely on a transmission part (such as a synchronous belt, a threaded rod, etc.) to achieve lifting and lowering have the transmission part set at a lateral portion of the sidewall, and in order to reduce space occupied by the tiering device inside the freight compartment, conventional technical means are usually as follows:

1. Using a wire rope that occupies less space, instead of a synchronous belt, for power transmission, in order to reduce occupancy of space inside a freight compartment. For example, Chinese Patent titled "Automatic-Conveyance Tiered Freight Compartment" (China Patent Application No.: 201620305567.4; Publication No.: CN205440076U) discloses using a wire rope as a transmission part to perform lifting and lowering of a support plate.
2. Installing a synchronous belt with a quick-detach installation method, and disassembling the synchronous belt when the tiering device is not in use, thus avoiding occupation of space inside the freight compartment by the synchronous belt.
3. Using a support plate to support goods, because it only requires to provide a lifting mechanism at four corners of the support plate, and the lifting mechanism provided can be exactly located at four corner positions of a freight compartment, whereas using a support cross beam to support goods requires to provide a lifting mechanism at both ends of every support cross beam; therefore, this solution can effectively optimize occupation of space inside a freight compartment by a tiering device. For example, Chinese Patent titled "Freight Transport System and Method Based on Unmanned Master-Minion Vehicle (China Patent Application No. 201811189161.4; Publication No. 109447547A) discloses this technical means.

SUMMARY

Some objectives of one embodiment of the present invention are to provide a tiering device for a freight compartment with respect to the above defects in the prior art, to solve the technical problem that an existing tiering device for a freight compartment occupies a relatively large space inside a freight compartment and thus is prone to affect loading/unloading goods to/from the freight compartment.

The objectives of the present invention can be achieved by the following technical solution.

In one embodiment of a tiering device for a freight compartment, comprising: a sidewall of the freight compartment, a transmission part, a support member capable of supporting goods, and a sliding mount connected to the support member; the sidewall of the freight compartment comprises a vertical guide track having a groove opening; the sidewall of the freight compartment is provided with an upper synchronous roller and a lower synchronous roller located below the upper synchronous roller; wherein, a first end of the transmission part is wound on the upper synchronous roller and connected to an upper end of the sliding mount, while a second end of the transmission part is wound on the lower synchronous roller and connected to a lower end of the sliding mount; the sliding mount has a sliding portion that protrudes between the two ends of the transmission part and extends into the groove opening to form a sliding fit with the vertical guide track; a first portion of the transmission part connected between the sliding mount and the upper synchronous roller and a second portion of the transmission part connected between the sliding mount and the lower synchronous roller are both located inside the vertical guide track or are both flush with the groove opening of the vertical guide track. The transmission part is flexible, such as a belt-shaped transmission part or a chain-shaped transmission part, etc.

Preferably, the transmission part is a synchronous belt, and the synchronous belt comprises an inner belt body and an outer belt body; the outer belt body comprises a first belt body of the synchronous belt connected between the sliding mount and the upper synchronous roller and a second belt body of the synchronous belt connected between the sliding mount and the lower synchronous roller; the inner belt body is located on a side of the outer belt body facing away from the sliding mount, and the inner belt body is located inside the vertical guide track.

Preferably, the transmission part is a roller chain, and both the upper synchronous roller and lower synchronous roller are sprockets with teeth; the roller chain engages with the upper synchronous roller and with the lower synchronous roller, respectively. Using roller chain allows greater transmission force and prevents slippage during transmission, ensuring stable performance of the tiering device for a freight compartment.

Preferably, the vertical guide track has a belt guide channel which extends vertically inside the vertical guide track and is open at two ends of the belt guide channel; the inner belt body is disposed within and extends through the belt guide channel; the outer belt body is located outside the belt guide channel and flush with the groove opening of the vertical guide track.

Preferably, the sliding mount comprises a bottom plate, and the bottom plate has an attachment surface disposed facing the groove opening; a first end of the synchronous belt wound on the upper synchronous roller is connected to an upper-end area of the attachment surface, while a second end of the synchronous belt wound on the lower synchronous roller is connected to a lower-end area of the attachment surface; the sliding portion is disposed on the attachment surface and located between the two ends of the synchronous belt.

Preferably, the bottom plate is provided with an avoidance notch below the sliding portion, such that the second end of the synchronous belt connected to the lower-end area of the attachment surface is located below the avoidance notch; the sliding mount is provided with a locking member that is capable of passing through the avoidance notch to fit with the vertical guide track so that the sliding mount is capable of being positioned at different heights on the vertical guide track. Such designed structure reduces space occupation inside a freight compartment while not affecting cooperation between the locking member on the sliding mount and the vertical guide track, enabling positioning the support member at different heights to support goods at different height positions.

Preferably, the groove opening is provided with a plurality of vertically spaced snap-in ports on edges of the groove opening; the locking member is hinged on the sliding mount, and the locking member is provided with a protruding snap catch, the snap catch capable of being inserted into any one of the snap-in ports through the avoidance notch to restrict downward movement of the sliding mount, and also capable of being released from the snap-in ports by swing of the locking member.

Preferably, the sidewall of the freight compartment further comprises a wallboard of the freight compartment; the vertical guide track comprises a first panel which is flush with or approximately flush with an inner surface of the wallboard, and a second panel disposed opposite to the first panel; a first connection plate and a second connection plate provided at intervals along a front-and-rear direction of the freight compartment are connected between the first panel and the second panel; a horizontally disposed mounting shaft penetrates the first connection plate and the second connection plate; the upper synchronous roller is sleeved on the mounting shaft, and the upper synchronous roller is located between the first connection plate and the second connection plate; the mounting shaft is connected with an electric motor capable of driving the mounting shaft to rotate. Providing the first connection plate and the second connection plate allows the mounting shaft to be well supported, ensuring stability of the mounting shaft and operation accuracy of the upper synchronous roller.

Preferably, the first connection plate and the second connection plate are parallel to each other; a partition plate is connected vertically between the first connection plate and the second connection plate; the partition plate, the second panel, the first connection plate, and the second connection plate together form the belt guide channel; the inner belt body and the outer belt body of the synchronous belt are located on two sides of the partition plate respectively; the groove opening is provided on the first panel and directly opposite to the partition plate.

Preferably, the vertical guide track is further provided with a roller holder, a pretensioning rod, and a connector inside the vertical guide track, with the lower synchronous roller being rotatably connected on the roller holder; the connector is located below the roller holder, and a position of the connector is fixed in a vertical direction; the pretensioning rod penetrates through both the connector and the roller holder in sequence along the vertical direction; between the pretensioning rod and the connector, there is provided a spring which downwardly pushes and presses the pretensioning rod; an upper end of the pretensioning rod is thread-connected with a screw cap whose lower end face abuts against the roller holder.

Preferably, the connector comprises a link pin, two vertical side plates disposed opposite to each other, and a top plate joining with top edges of the two vertical side plates; the pretensioning rod is a threaded rod whose head is located below the top plate; the spring is sleeved on a shank portion of the threaded rod, with an upper end of the spring abutting against the top plate while a lower end of the spring abutting against the head of the threaded rod; the link pin penetrates through both lower ends of the two vertical side plates, with two ends of the link pin being inserted into and connected with the vertical guide track respectively. With the two ends of the link pin being inserted into and connected with the vertical guide track respectively, a position of the connector is fixed in a vertical direction.

Preferably, the electric motor is provided at a top portion of the sidewall of the freight compartment; a drive pulley is sleeved on a rotating shaft of the electric motor, a synchronous pulley is sleeved on the mounting shaft to rotate synchronously with the mounting shaft, and a belt is wound on and between the drive pulley and the synchronous pulley to synchronize rotation of both the drive pulley and the synchronous pulley.

Preferably, the bottom plate is in an elongated plate shape and vertically disposed, with two vertical edges of the bottom plate being joining with two lateral mounting plates respectively; the locking member is located between the two lateral mounting plates and hinged to the two lateral mounting plates; the support member is a support cross beam, one end of the support cross beam is hinged to the two lateral mounting plates of the sliding mount. Such setting enables convenient connection of the locking member and of the support member, and ensures stable connection of the locking member and of the support member.

Compared to the prior art, the present tiering device for a freight compartment has the following advantages:
1. With the design of the synchronous belt embedded into a sidewall of a freight compartment, the synchronous belt will not occupy space inside the freight compartment, facilitating loading/unloading goods to/from the freight compartment.
2. Providing the partition plate in the vertical guide track to form the belt guide channel, allows the inner belt body of the synchronous belt to be disposed within and extend through the belt guide channel, avoiding interference between the inner belt body and the outer belt body of the synchronous belt in the case of a small thickness of the sidewall of the freight compartment, ensuring smooth operation of the synchronous belt and stable performance of the present tiering device for a freight compartment.
3. Installation of the lower synchronous roller in the tiering device for a freight compartment enables tension adjustment of the synchronous belt, not only achieving convenient installation of the synchronous belt, but also ensuring that the synchronous belt is at a proper tension to stably drive the support member to lift/lower.

DETAILED DESCRIPTION

Set forth below are specific embodiments of the present invention and a further description of the technical solutions of the present invention in conjunction with the accompanying drawings, but the present invention is not limited to these embodiments.

Embodiment I

Figure 1:
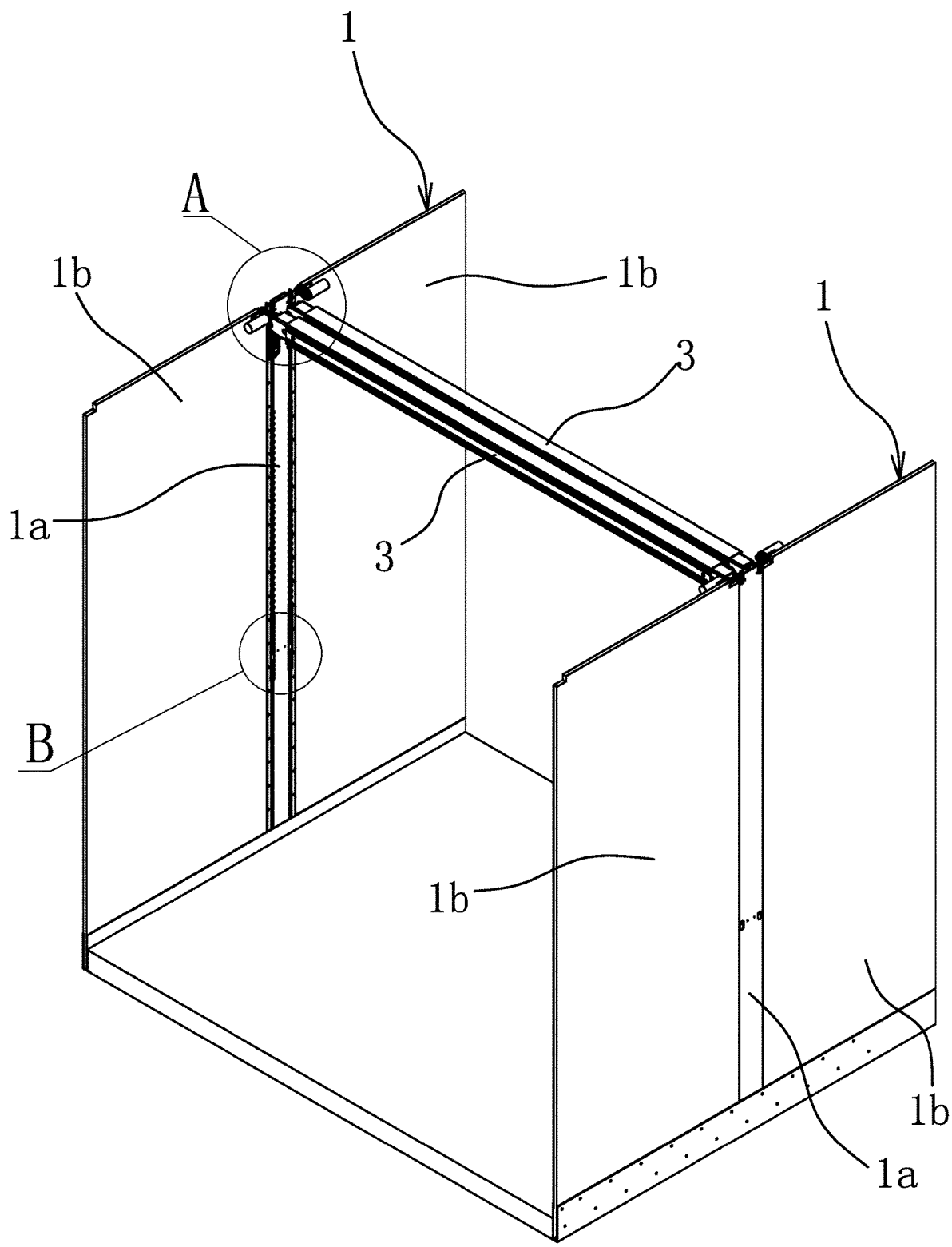
FIG. 1 is a perspective view of a structure of Embodiment I of the present invention.
Figure 2:
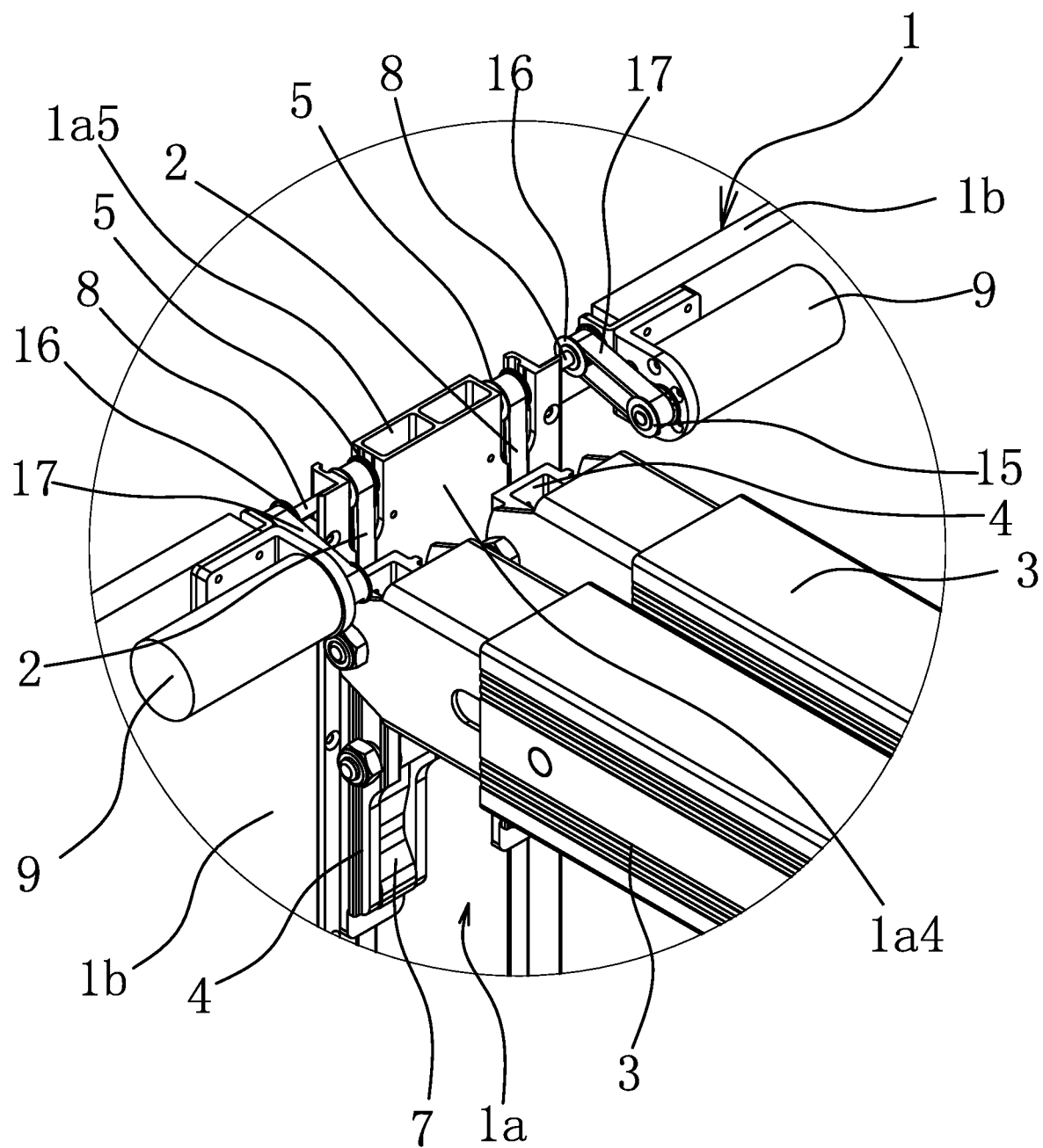
FIG. 2 is an enlarged view of Section A in FIG. 1.
Figure 3:
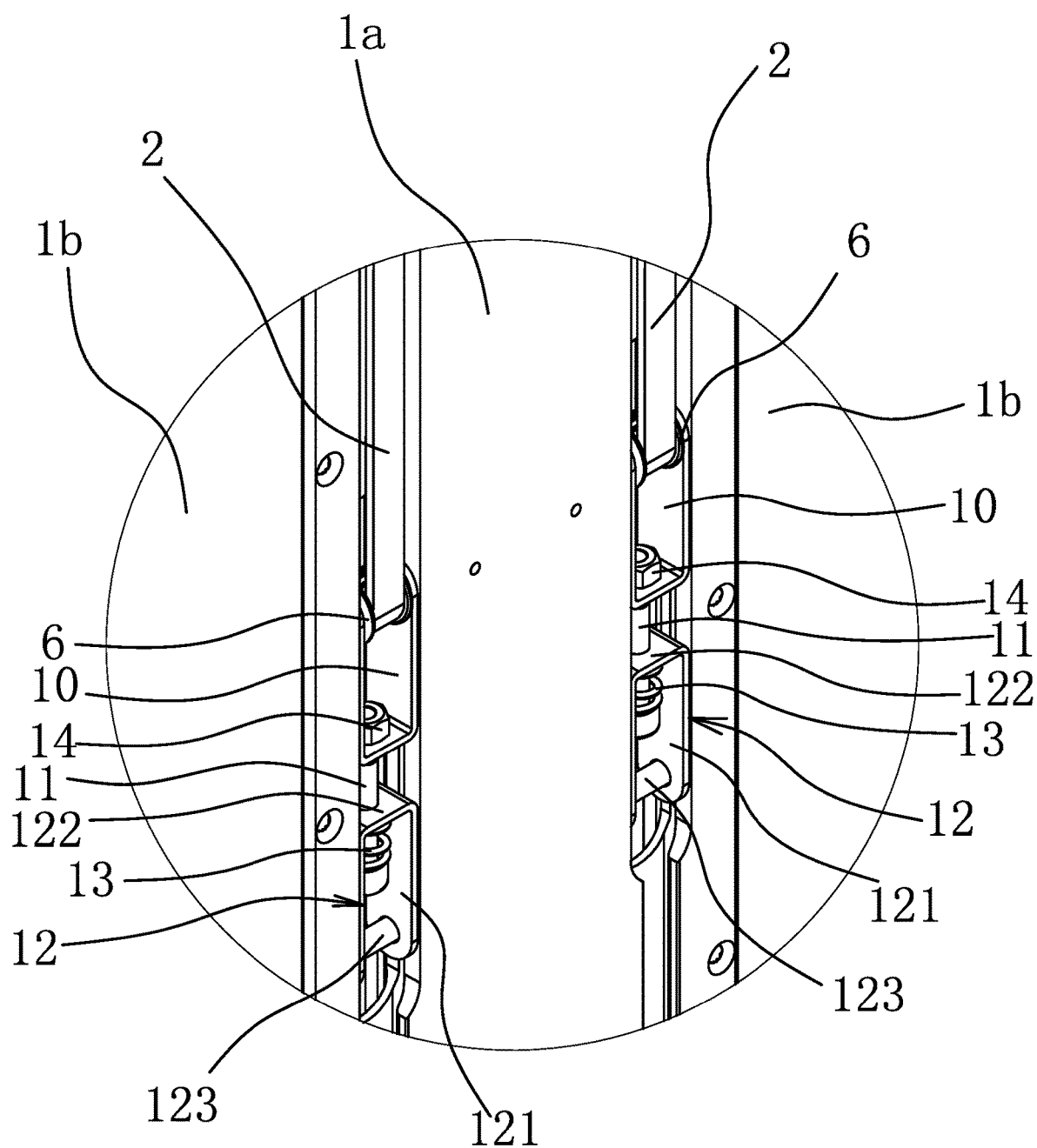
FIG. 3 is an enlarged view of Section B in FIG. 1.

As shown in FIGS. 1, 2, and 3, one embodiment of the present tiering device for a freight compartment comprises: a sidewall 1 of the freight compartment, a synchronous belt 2, a support member 3 capable of supporting goods, and a sliding mount 4 connected to the support member 3. The support member 3 is a support cross beam; the freight compartment has two sidewalls 1, each sidewall 1 comprising: a vertical guide track 1a having a groove opening 1a1, and at least two wallboards 1b provided at intervals along a front-and-rear direction of the freight compartment; the vertical guide track 1a is connected between the two adjacent wallboards 1b, and the vertical guide tracks 1a provided on the two sidewalls 1 respectively are arranged to be directly opposite to each other along a width direction of the freight compartment. The vertical guide track 1a is provided therein with an upper synchronous roller 5 and a lower synchronous roller 6 located below the upper synchronous roller 5, wherein the upper synchronous roller 5 is disposed at a top end of the vertical guide track 1a, while the lower synchronous roller 6 is disposed at a lower-middle portion of the vertical guide track 1a.

Figure 4:
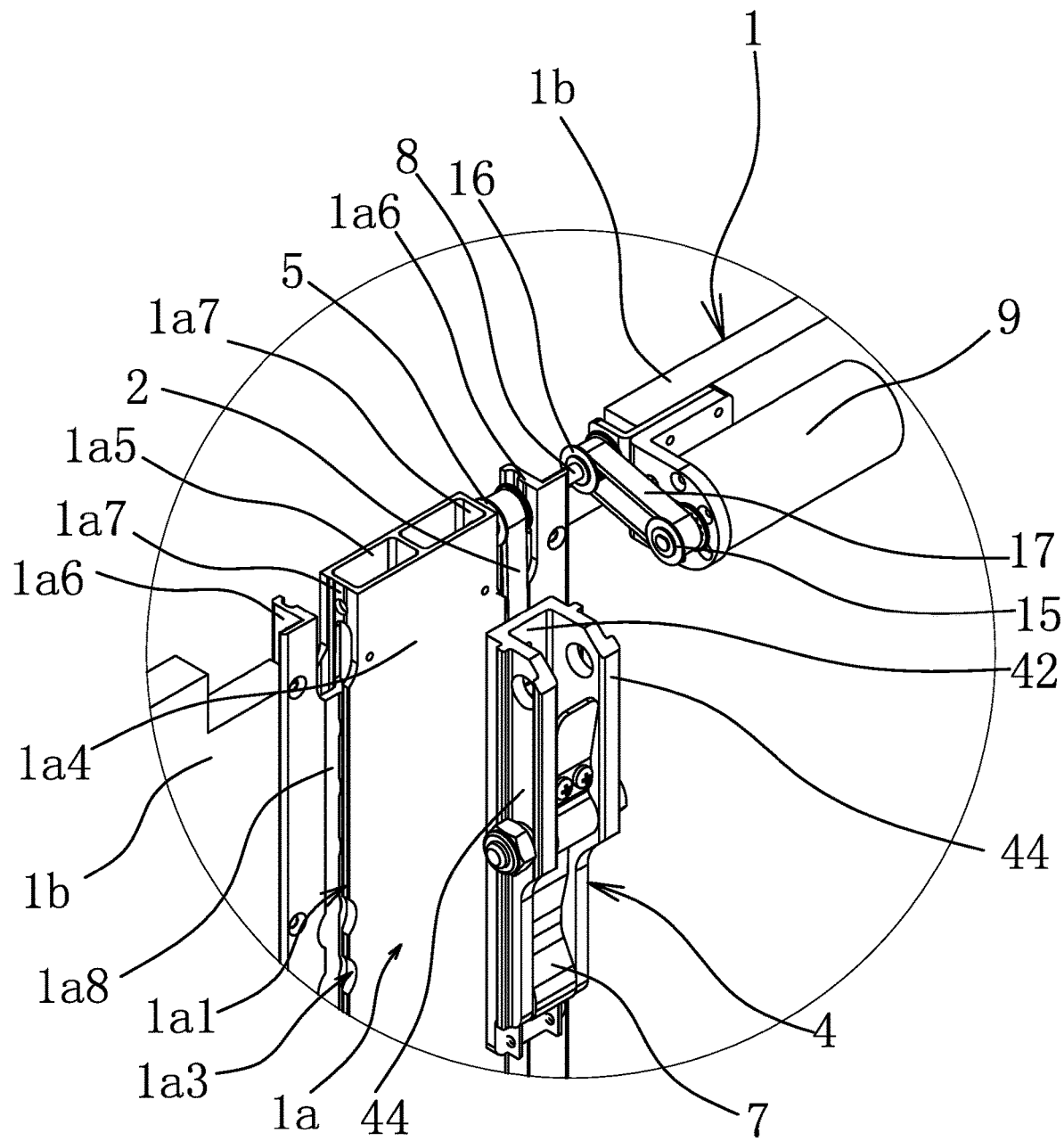
FIG. 4 is a schematic diagram illustrating a connection between the sliding mount and the vertical guide track in Embodiment I of the present invention.
Figure 5:
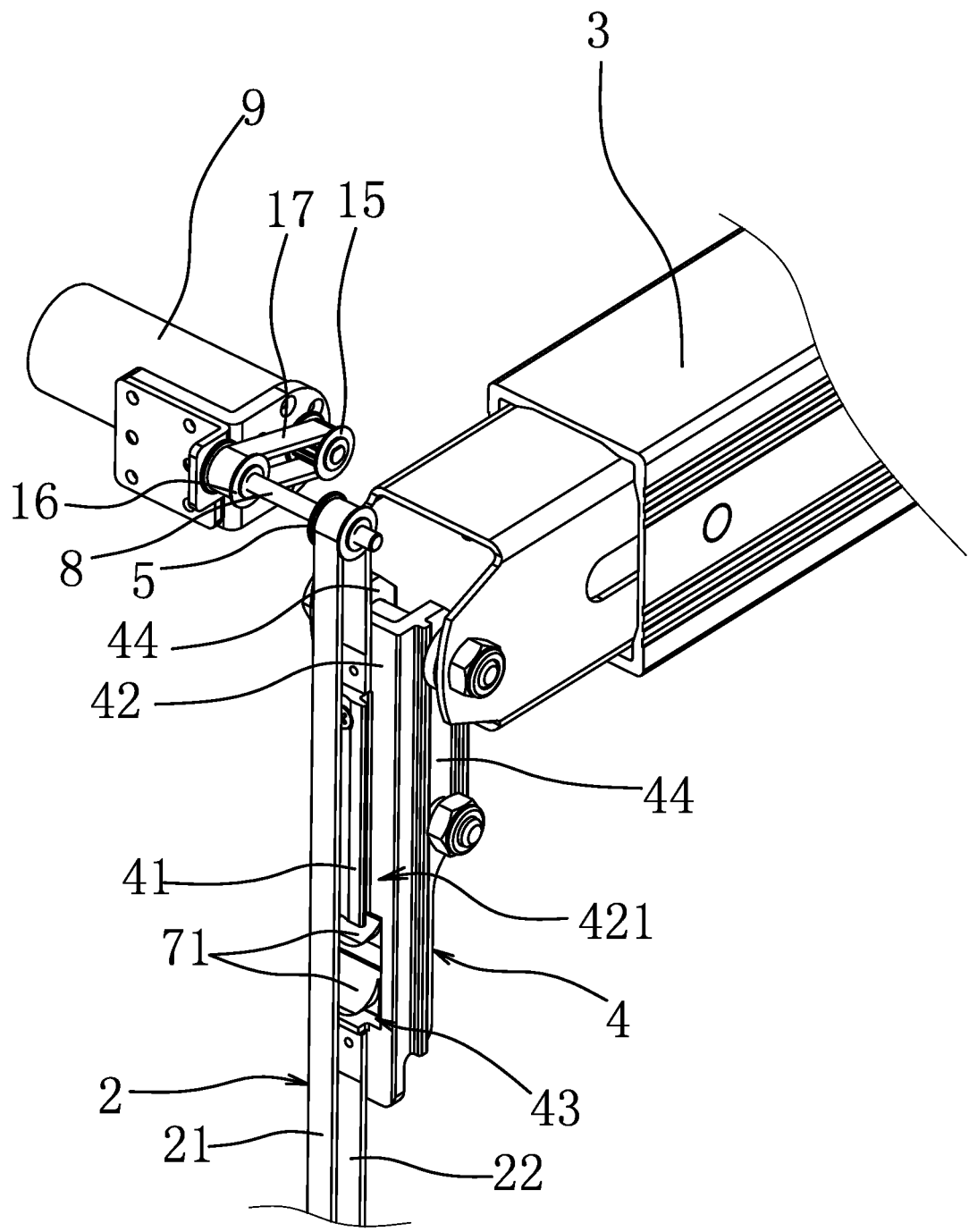
FIG. 5 is a schematic diagram illustrating connections among the sliding mount, the support member, the synchronous belt, and the electric motor in Embodiment I of the present invention.

Regarding installation of the synchronous belt 2, as shown in FIGS. 4 and 5, two ends of the synchronous belt 2 are wound on the upper synchronous roller 5 and the lower synchronous roller 6, respectively, to form an inner belt body 21 and an outer belt body 22; a first end of the synchronous belt 2 wound on the upper synchronous roller 5 is connected to an upper end of the sliding mount 4, and a second end of the synchronous belt 2 wound on the lower synchronous roller 6 is connected to a lower end of the sliding mount 4; the outer belt body 22 comprises a first belt body of the synchronous belt 2 connected between the sliding mount 4 and the upper synchronous roller 5 and a second belt body of the synchronous belt 2 connected between the sliding mount 4 and the lower synchronous roller 6. The sliding mount 4 has a sliding portion 41 that protrudes between the two ends of the synchronous belt 2 and extends into the groove opening 1a1 to form a sliding fit with the vertical guide track 1a.

Figure 6:
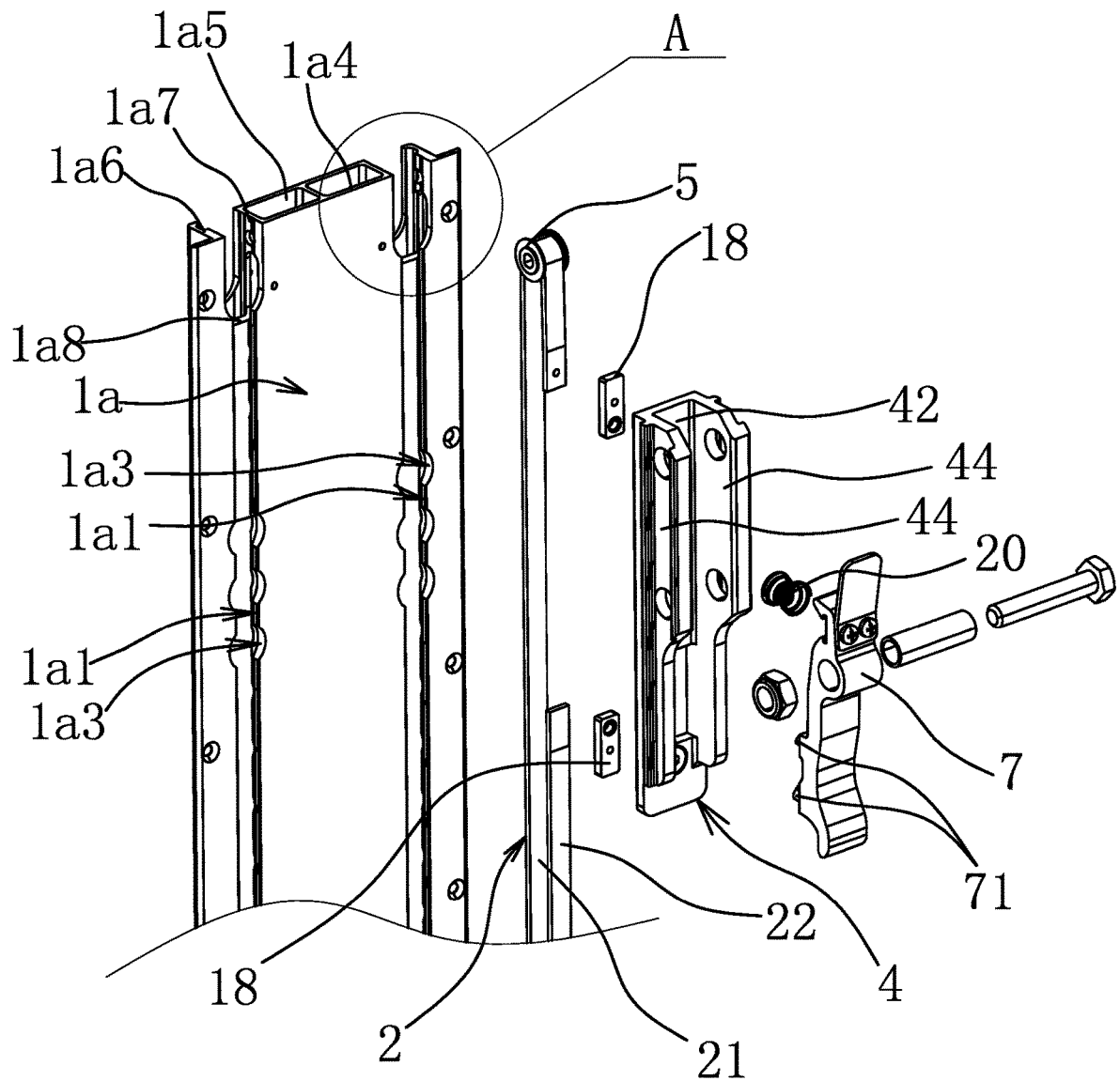
FIG. 6 is a first exploded perspective view of a first part of Embodiment I of the present invention.
Figure 7:
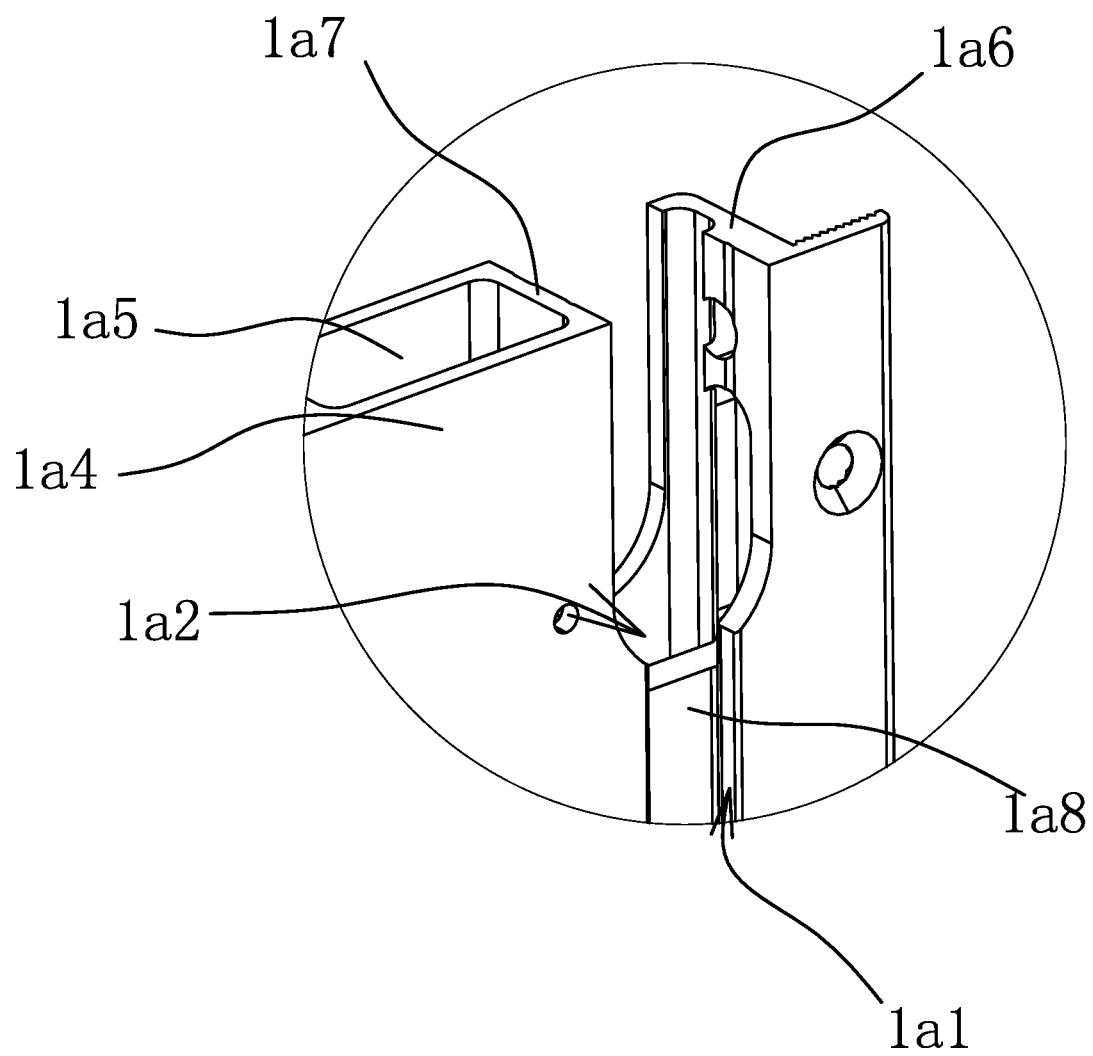
FIG. 7 is an enlarged view of Section A in FIG. 6.

As shown in FIGS. 6 and 7, one embodiment of the vertical guide track 1a has a belt guide channel 1a2 which extends vertically inside the vertical guide track 1a and is open at two ends of the belt guide channel 1a2; the inner belt body 21 is disposed within and extends through the belt guide channel 1a2, and is located on the side of the outer belt body 22 that is away from the sliding mount 4; the outer belt body 22 is located outside the belt guide channel 1a2 and flush with the groove opening 1a1 of the vertical guide track 1a. In this embodiment, the tiering device for a freight compartment adopts such a design that the synchronous belt 2 is embedded in the vertical guide track 1a, avoiding occupation of space inside the freight compartment by the synchronous belt 2 and thus facilitating loading/unloading goods to/from the freight compartment, meanwhile, the synchronous belt 2 is formed with a gap between its two ends, allowing the sliding portion 41 of the sliding mount 4 to extend into the groove opening 1a1 to form a sliding fit with the vertical guide track 1a; therefore, adoption of the space-saving design of embedding the synchronous belt 2 into the sidewall 1 of the freight compartment will not affect a sliding fit between the sliding mount 4 and the vertical guide track 1a, moreover, through rotation of the upper synchronous roller 5 or the lower synchronous roller 6, the sliding mount 4 in the vertical guide track 1a can be lifted/lowered to achieve height adjustment of support member 3.

Figure 8:
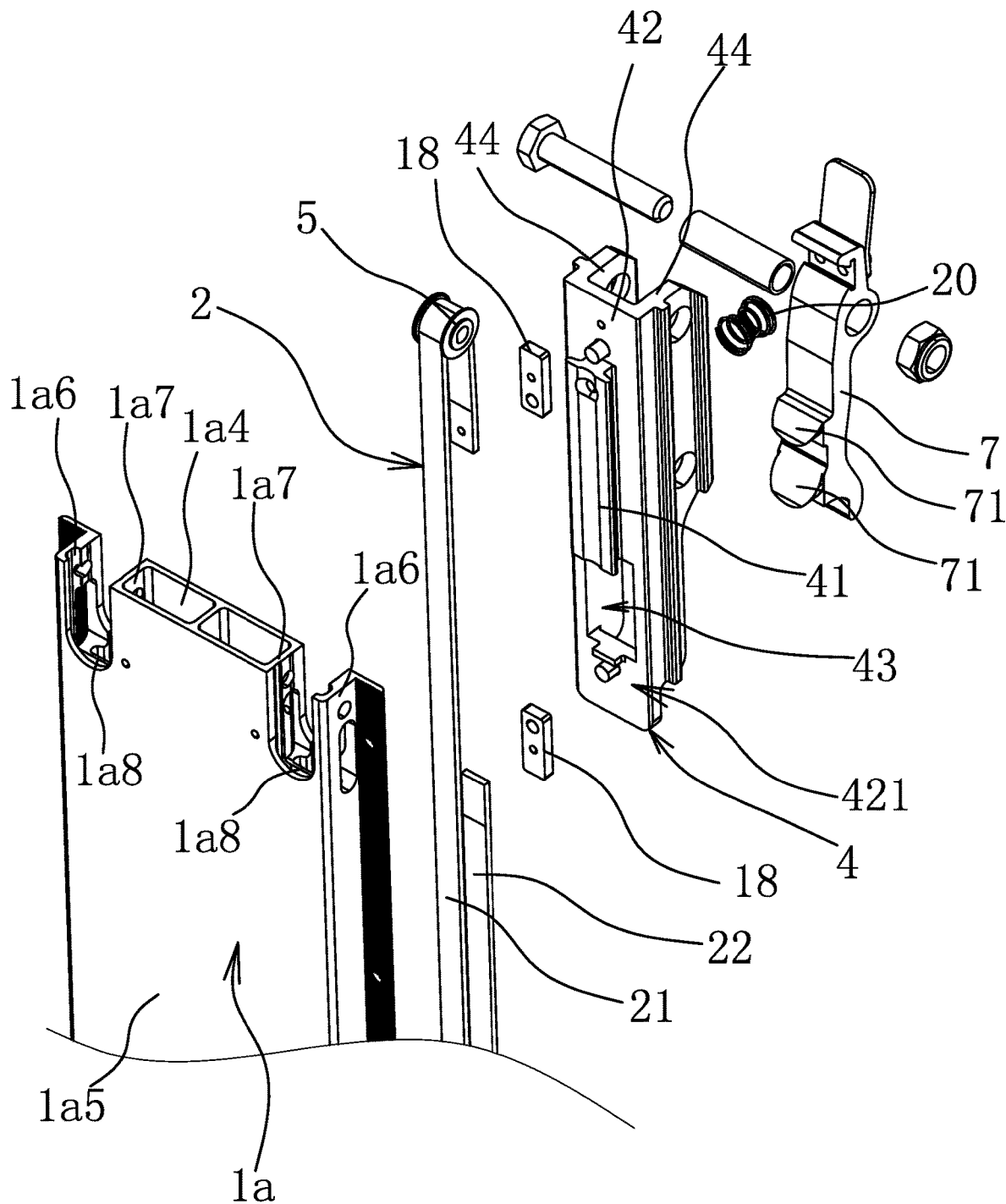
FIG. 8 is a second exploded perspective view of the first part of Embodiment I of the present invention.
Figure 9:
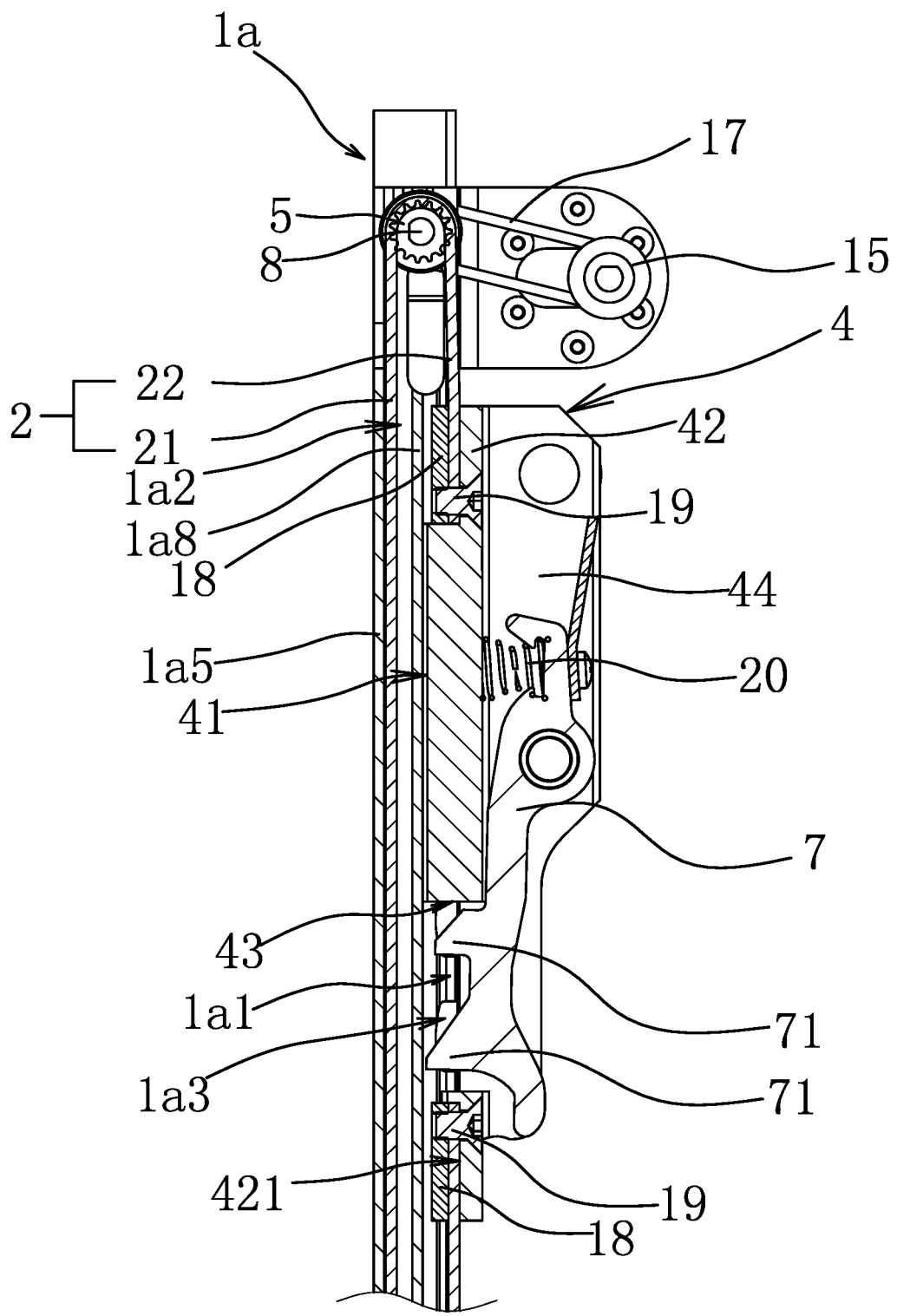
FIG. 9 is a cross-sectional view of the first part of Embodiment I of the present invention.

Specifically, as shown in FIGS. 5 to 9, one embodiment of the sliding mount 4 comprises a bottom plate 42 which is in an elongated plate shape and vertically disposed, with two vertical edges of the bottom plate 42 being joining with two lateral mounting plates 44 respectively; one end of the support cross beam is hinged to the two lateral mounting plates 44 of one sliding mount 4; a locking member 7 is located between the two lateral mounting plates 44 and is hinged to the two lateral mounting plates 44. The bottom plate 42 has an attachment surface 421 disposed facing the groove opening 1a1; the first end of the synchronous belt 2 wound on the upper synchronous roller 5 is connected to an upper-end area of the attachment surface 421 by a pressing plate 18, while the second end of the synchronous belt 2 wound on the lower synchronous roller 6 is connected to a lower-end area of the attachment surface 421 by another pressing plate 18; the sliding portion 41 is disposed on the attachment surface 421 and located between the two ends of the synchronous belt 2. As shown in FIG. 9, both the pressing plates 18 are connected to the bottom plate 42 by a bolt 19, respectively, meanwhile, the synchronous belt 2 is provided thereon with a hole for the bolt 19 to pass through; when the bolts 19 are tightened, the pressing plates 18 press the two ends of the synchronous belt 2 tightly, making the two ends of the synchronous belt 2 securely connected with the sliding mount 4, thus ensuring that the sliding mount 4 and the synchronous belt 2 always move synchronously.

Figure 10:
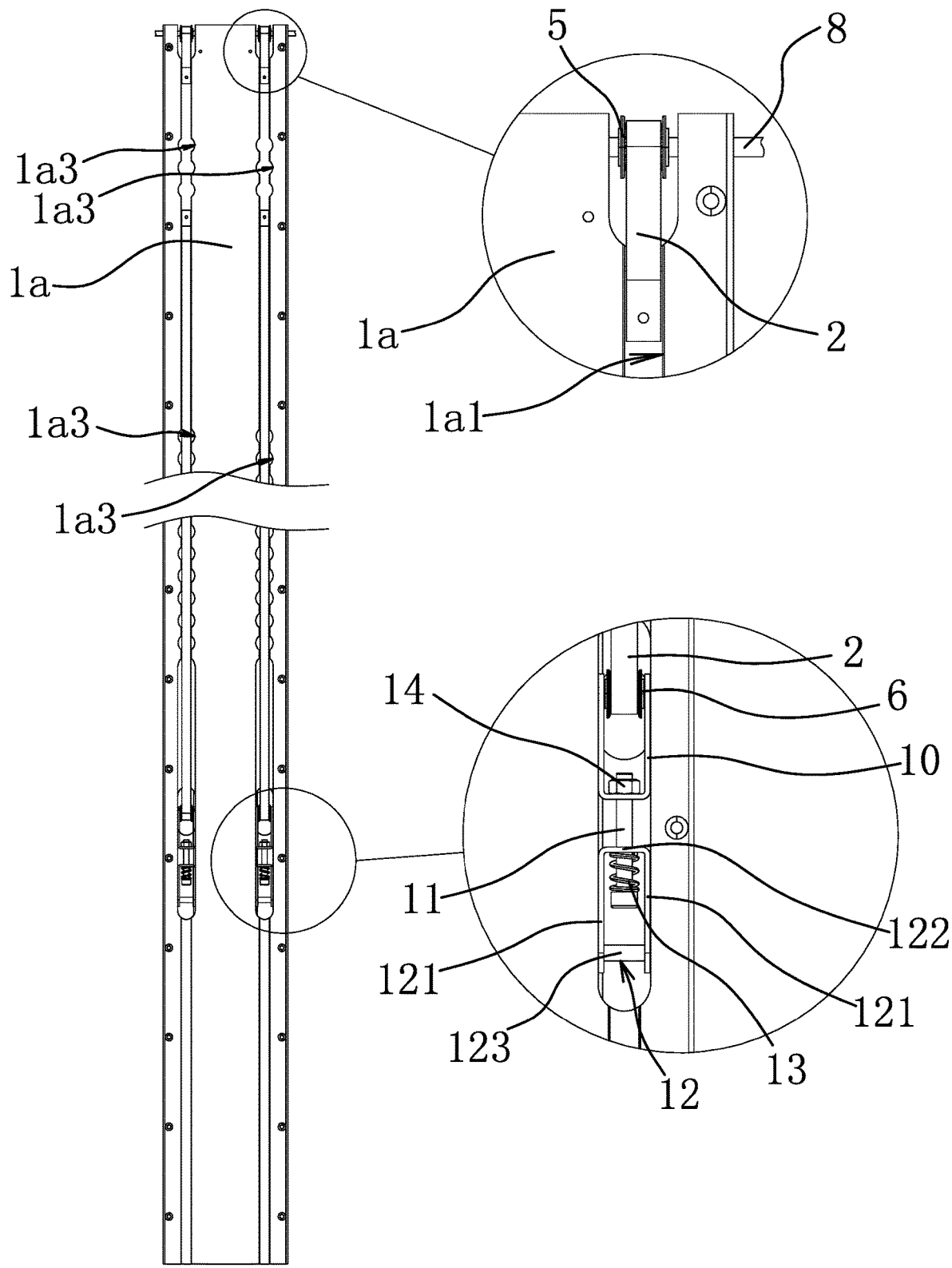
FIG. 10 is a front view of the vertical guide track and the synchronous belt in Embodiment I of the present invention.

In order to allow positioning of the support cross beam at different heights to support goods at different heights, as shown in FIGS. 8 to 10, one embodiment of the groove opening 1a1 is provided with a plurality of vertically spaced snap-in ports 1a3 on edges of the groove opening 1a1, the snap-in port 1a3 being in a semi-arc shape, and the snap-in ports 1a3 on the left and right edges of the groove opening 1a1 being directly opposite one another. The bottom plate 42 is provided with an avoidance notch 43 below the sliding portion 41, such that the second end of the synchronous belt 2 connected to the lower-end area of the attachment surface 421 is located below the avoidance notch 43; the locking member 7 is provided with a protruding snap catch 71 at its lower end, the snap catch 71 capable of being inserted into any one of the snap-in ports 1a3 through the avoidance notch 43 to restrict downward movement of the sliding mount 4, and also capable of being released from the snap-in ports 1a3 by swing of the locking member 7. Further, to ensure that the snap catch 71 in a locked state can be kept securely in snap-fit in the snap-in port 1a3, a locking spring 20 is provided between an upper end of the locking member 7 and the bottom plate 42 of the sliding mount 4. Hence, when adjusting the height of the support cross beam upward, the synchronous belt 2 drives the sliding mount 4 to move upward, and because a top surface of the snap catch 71 is an inclined surface, a guiding effect of the inclined surface enables the snap catch 71 to be automatically released from the snap-in port 1a3 to achieve automatic unlocking; when adjusting the height of the support cross beam downward, it only needs to swing the locking member 7 to cause the snap catch 71 to disengage from the snap-in port 1a3, so that the sliding mount 4 can be moved downward under the action of the synchronous belt 2 to lower the height of the support cross beam.

Figure 11:
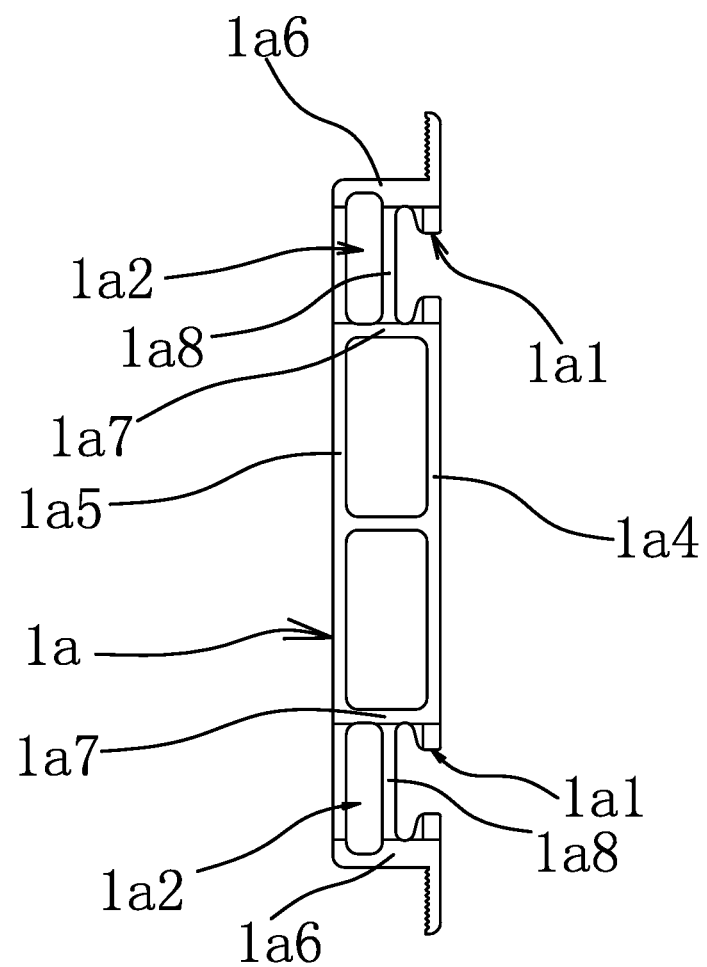
FIG. 11 is a top view of the vertical guide track in Embodiment I of the present invention.

In conjunction with FIGS. 2 and 11, one embodiment of the vertical guide track 1a is of a dual-groove-opening 1a1 design, that is, each vertical guide track 1a is provided thereon with two groove openings 1a1 parallel to each other, and capable of being connected with two support cross beams. Of course, in practical manufacturing process, the vertical guide track 1a also may adopt a single-groove-opening 1a1 design, that is, each vertical guide track 1a is connected with only one support cross beam. In the dual-groove-opening 1a1 design, specifically, the vertical guide track 1a comprises a first panel 1a4 and a second panel 1a5 that are parallel to each other, with the first panel 1a4 being flush with or approximately flush with an inner surface of the wallboard 1b, and the second panel 1a5 being flush with or approximately flush with an outer surface of the wallboard 1b. Two sets of first connection plate 1a6 and second connection plate 1a7 are connected between the first panel 1a4 and the second panel 1a5; the first connection plate 1a6 and the second connection plate 1a7 are parallel to each other, and the two sets of first connection plate 1a6 and second connection plate 1a7 are located at front and rear sides of the vertical guide track 1a respectively and form a symmetrical structure; the first connection plate 1a6 and second connection plate 1a7 in each set are provided at intervals along a front-and-rear direction of the freight compartment, and a horizontally disposed mounting shaft 8 penetrates the first connection plate 1a6 and the second connection plate 1a7 in each set; the upper synchronous roller 5 is sleeved on the mounting shaft 8, and the upper synchronous roller 5 is located between the first connection plate 1a6 and the second connection plate 1a7; the mounting shaft 8 is connected with an electric motor 9 capable of driving the mounting shaft 8 to rotate. Setting the electric motor 9 to drive rotation of the mounting shaft 8 enhances automation of the present tiering device for a freight compartment, and avoids many troubles caused by manual operation.

As shown in FIGS. 2 and 5, one embodiment of the electric motor 9 is provided at a top portion of the sidewall 1 of the freight compartment; for implementation of rotation of the mounting shaft 8 driven by the electric motor 9, a drive pulley 15 is sleeved on a rotating shaft of the electric motor 9, a synchronous pulley 16 is sleeved on the mounting shaft 8 to rotate synchronously with the mounting shaft 8, and a belt 17 is wound on and between the drive pulley 15 and the synchronous pulley 16 to synchronize rotation of both the drive pulley 15 and the synchronous pulley 16. In this embodiment, setting the electric motor 9 on the top portion of the sidewall 1 of the freight compartment can reduce to the maximum extent possibility of interference with goods during loading/unloading to/from the freight compartment, and rotation of the rotating shaft of the electric motor 9 is transferred through the drive pulley 15, the belt 17 and the synchronous pulley 16 sequentially to the mounting shaft 8, which in turn drives the upper synchronous roller 5 to rotate.

In conjunction with FIGS. 9 and 11, a partition plate 1a8 is connected vertically between the first connection plate 1a6 and the second connection plate 1a7; the partition plate 1a8, the second panel 1a5, the first connection plate 1a6, and the second connection plate 1a7 together form the belt guide channel 1a2; the inner belt body 21 and the outer belt body 22 of the synchronous belt 2 are located on two sides of the partition plate 1a8 respectively; the groove opening 1a1 is provided on the first panel 1a4 and directly opposite to the partition plate 1a8. Providing the partition plate 1a8 allows formation of the belt guide channel 1a2 in the vertical guide track 1a for the inner belt body 21 to be disposed therein and extend therethrough, thus the inner belt body 21 is separated from the outer belt body 22 by the partition plate 1a8, and this design ensures that the inner belt body 21 and outer belt body 22 do not interfere with each other under thickness limitation of the sidewall 1, enabling the synchronous belt 2 to operate stably while being embedded in the vertical guide track 1a for saving space inside the freight compartment.

Figure 12:
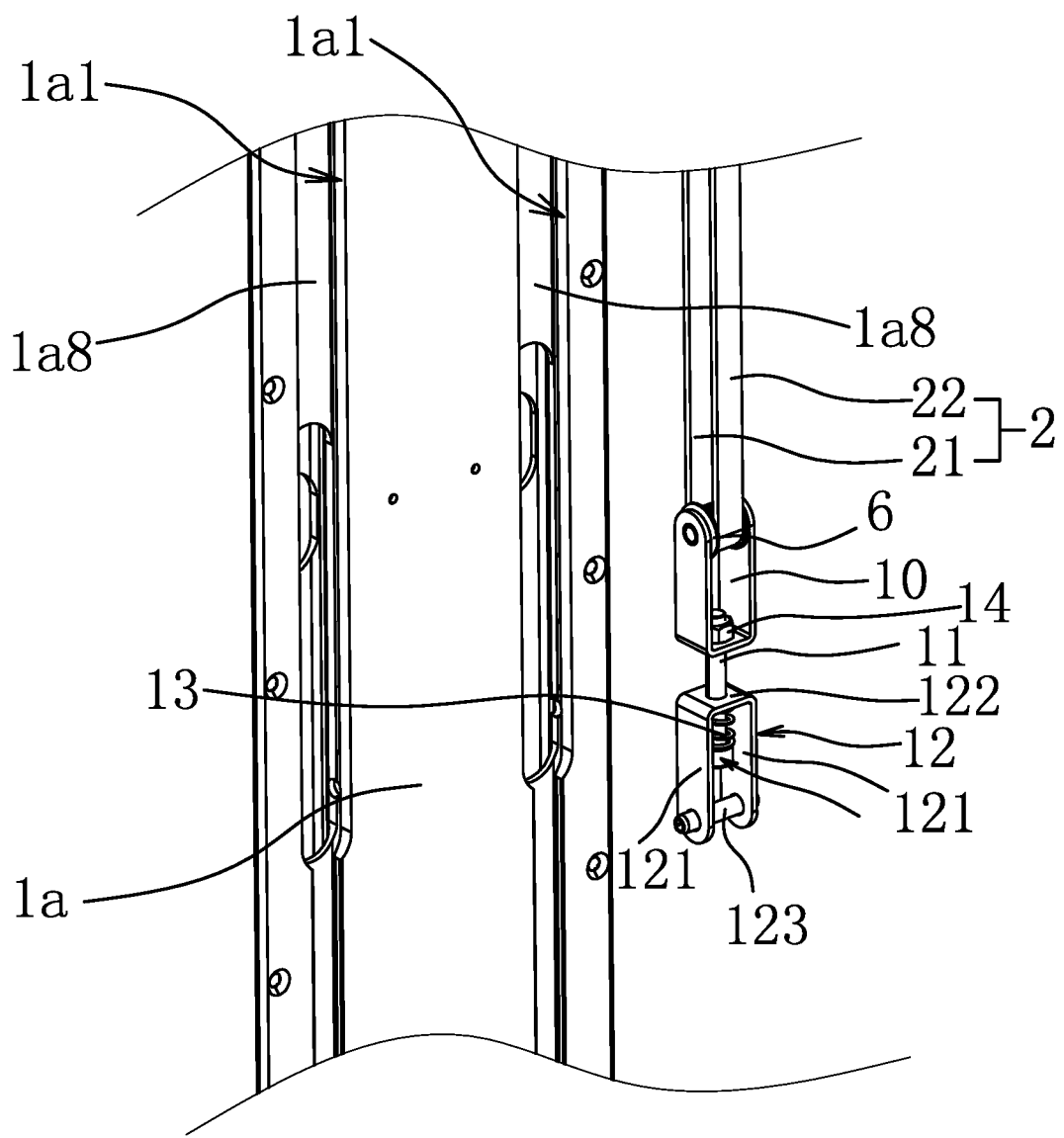
FIG. 12 is an exploded perspective view of a second part of Embodiment I of the present invention.

Regarding installation of the lower synchronous roller 6, as shown in FIGS. 3, 10, and 12, the vertical guide track 1a is further provided with a roller holder 10, a pretensioning rod 11, and a connector 12 inside the vertical guide track 1a, with the lower synchronous roller 6 being rotatably connected on the roller holder 10; the connector 12 is located below the roller holder 10, the connector 12 comprises a link pin 123, two vertical side plates 121 disposed opposite to each other, and a top plate 122 joining with top edges of the two vertical side plates 121; the link pin 123 penetrates through both lower ends of the two vertical side plates 121, with two ends of the link pin 123 being inserted into and connected with the vertical guide track 1a respectively, so that a position of the connector 12 is fixed in a vertical direction. The pretensioning rod 11 is a bolt, with a shank portion of the bolt penetrating through both the top plate 122 of the connector 12 and the roller holder 10 in sequence along the vertical direction and a head of the bolt being located below the top plate 122; a spring 13 that downwardly pushes and presses the pretensioning rod 11 is sleeved on the shank portion of the bolt, with an upper end of the spring 13 abutting against the top plate 122 while a lower end of the spring 13 abutting against the head of the bolt; an upper end of the shank portion of the bolt is thread-connected with a screw cap 14 whose lower end face abuts against the roller holder 10, the screw cap 14 being welded to the roller holder 10. As the connector 12 is located below the roller holder 10 and the position of the connector 12 is fixed in the vertical direction, turning the pretensioning rod 11 enables the pretensioning rod 11 to move up and down with respect to the roller holder 10, causing an increase or decrease in compression of the spring 13 and in turn an increase or decrease in force of the spring 13 pulling downward on the synchronous belt 2, thereby varying tension of the synchronous belt 2. Such design can, on the one hand, keep the synchronous belt 2 at a proper tension through adjustment of the pretensioning rod 11, avoiding slippage or unsmooth operation of the synchronous belt 2 for being too loose or too tight, ensuring that the synchronous belt 2 can always operate stably to drive the support member 3 to lift/lower. On the other hand, the synchronous belt 2 is designed to be embedded in the vertical guide track 1a, therefore, connection of the two ends of the synchronous belt 2 to the sliding mount 4 should be prior to insertion and connection of the sliding mount 4 to the vertical guide track 1a, and connection of the synchronous belt 2 to the sliding mount 4 cannot be adjusted once the sliding mount 4 is installed; however, the above design in this embodiment allows to compensate for a positional error caused by insufficient installation accuracy in connection of the synchronous belt 2 to the sliding mount 4, by fine-tuning the position of the roller holder 10 through the role of the spring 13, thus making installation of the synchronous belt 2 more convenient.

Figure 13:
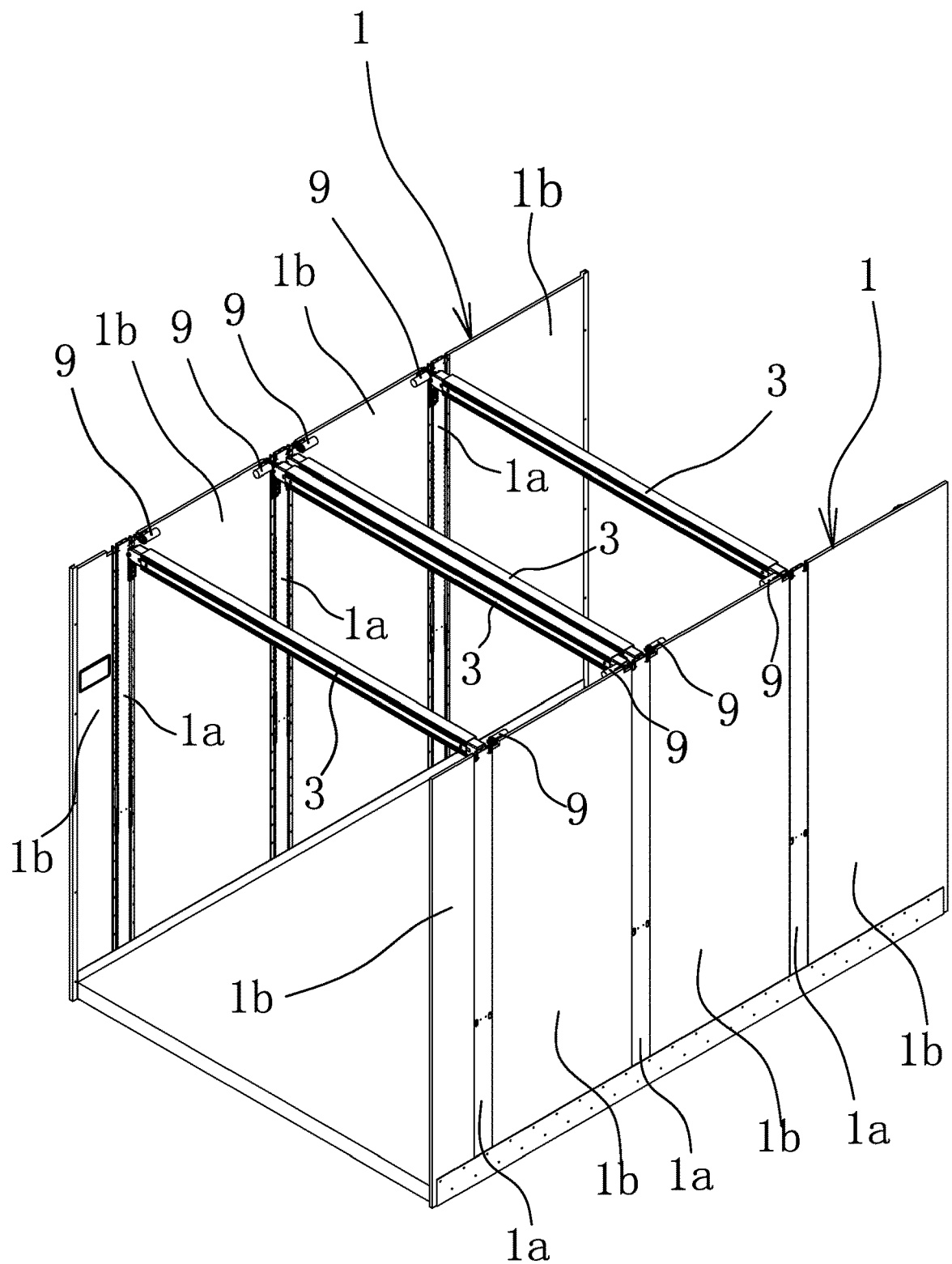
FIG. 13 is a schematic diagram illustrating Embodiment I of the present invention in use.

As shown in FIG. 13, in an actual manufacturing process of the present tiering device for a freight compartment, each of the sidewalls 1 on the left and right sides of the freight compartment comprises a plurality of the wallboards 1b, with every two adjacent wallboards 1b being connected with a dual-groove-opening 1a1 vertical guide track 1a provided therebetween, and the vertical guide tracks 1a on the two sidewalls 1 respectively are arranged to be directly opposite to each other along a width direction of the freight compartment. The support cross beam is connected at each end to the vertical guide track 1a by the same structure mentioned above, in this way, the support cross beam is supported by the sliding mount 4 at both ends, and during lifting and lowering of the support cross beam, the support cross beam is driven by the synchronous belt 2 at both ends, making lifting and lowering of the support cross beam at both ends synchronous and therefore more stable. Of course, for supporting some lightweight goods, such as empty plastic wine barrels, it is also feasible for the support cross beam to be driven by the synchronous belt 2 at one end while the other end being simply slidably connected to the sidewall 1 or even suspended in air.

Embodiment II

This embodiment basically has the same structure and principle as Embodiment I, with differences in that: the first belt body of the synchronous belt 2 connected between the sliding mount 4 and the upper synchronous roller 5 and the second belt body of the synchronous belt 2 connected between the sliding mount 4 and the lower synchronous roller 6 are both located inside the vertical guide track 1a, in other words, compared to Embodiment I, the outer belt body 22 of the synchronous belt 2 is closer to the partition plate 1a8, so that the outer belt body 22 is located at an inner side of the groove opening 1a1 of the vertical guide track 1a. This makes the synchronous belt 2 wholly embedded in the vertical guide track 1a, avoiding occupation of space inside the freight compartment by the synchronous belt 2 and thus facilitating loading/unloading goods to/from the freight compartment.

Embodiment III

This embodiment basically has the same structure and principle as Embodiment I, with differences in that: the support member 3 is a support plate, each of its four corners being connected to one sliding mount 4, meanwhile, a total of four vertical guide tracks 1a are provided in both sidewalls 1 on the left and right sides of the freight compartment to connect with the four sliding mounts 4 one by one, each vertical guide track 1a being provided therein with a synchronous belt 2 to drive the corresponding sliding mount 4 up and down.

Embodiment IV

This embodiment basically has the same structure and principle as Embodiment I, with differences in that: the transmission part is a roller chain, and both the upper synchronous roller 5 and lower synchronous roller 6 are sprockets with teeth; the roller chain engages with the upper synchronous roller 5 and with the lower synchronous roller 6, respectively.

REFERENCED PARTS

1 Sidewall
1a Vertical Guide Track
1a1 Groove Opening
1a2 Belt Guide Channel
1a3 Snap-in Port
1a4 First Panel
1a5 Second Panel
1a6 First Connection Plate
1a7 Second Connection Plate
1a8 Partition Plate
1b Wallboard
2 Synchronous Belt
21 Inner Belt Body
22 Outer Belt Body 3 Support Member
4 Sliding Mount
41 Sliding Portion
42 Bottom plate
421 Attachment Surface
43 Avoidance Notch
44 Lateral Mounting Plate
5 Upper Synchronous Roller
6 Lower Synchronous Roller
7 Locking Member
71 Snap Catch
8 Mounting Shaft
9 Electric Motor
10 Roller Holder
11 Pretensioning Rod
12 Connector
121 Vertical Side Plate
122 Top Plate
123 Link Pin
13 Spring
14 Screw Cap
15 Drive Pulley
16 Synchronous Pulley
17 Belt
18 Pressing Plate
19 Bolt
20 Locking Spring

The invention claimed is:

1. A tiering device for a freight compartment, comprising: a sidewall of the freight compartment, a transmission part, a support member capable of supporting goods, and a sliding mount connected to the support member; the sidewall of the freight compartment comprises a vertical guide track having a groove opening; the sidewall of the freight compartment is provided with an upper synchronous roller and a lower synchronous roller located below the upper synchronous roller; wherein, a first end of the transmission part is wound on the upper synchronous roller and connected to an upper end of the sliding mount, while a second end of the transmission part is wound on the lower synchronous roller and connected to a lower end of the sliding mount; the sliding mount has a sliding portion that protrudes between the two ends of the transmission part and extends into the groove opening to form a sliding fit with the vertical guide track; a first portion of the transmission part connected between the sliding mount and the upper synchronous roller and a second portion of the transmission part connected between the sliding mount and the lower synchronous roller are both located inside the vertical guide track or are both flush with the groove opening of the vertical guide track.

2. The tiering device for a freight compartment as claimed in claim 1, wherein the transmission part is a synchronous belt, and the synchronous belt comprises an inner belt body and an outer belt body; the outer belt body comprises a first belt body of the synchronous belt connected between the sliding mount and the upper synchronous roller and a second belt body of the synchronous belt connected between the sliding mount and the lower synchronous roller; the inner belt body is located on a side of the outer belt body facing away from the sliding mount, and the inner belt body is located inside the vertical guide track.

3. The tiering device for a freight compartment as claimed in claim 1, wherein the transmission part is a roller chain, and both the upper synchronous roller and lower synchronous roller are sprockets with teeth; the roller chain engages with the upper synchronous roller and with the lower synchronous roller, respectively.

4. The tiering device for a freight compartment as claimed in claim 2, wherein the vertical guide track has a belt guide channel which extends vertically inside the vertical guide track and is open at two ends of the belt guide channel; the inner belt body is disposed within and extends through the belt guide channel; the outer belt body is located outside the belt guide channel and flush with the groove opening of the vertical guide track.

5. The tiering device for a freight compartment as claimed in claim 2, wherein the sliding mount comprises a bottom plate, and the bottom plate has an attachment surface disposed facing the groove opening; a first end of the synchronous belt wound on the upper synchronous roller is connected to an upper-end area of the attachment surface, while a second end of the synchronous belt wound on the lower synchronous roller is connected to a lower-end area of the attachment surface; the sliding portion is disposed on the attachment surface and located between the two ends of the synchronous belt.

6. The tiering device for a freight compartment as claimed in claim 5, wherein the bottom plate is provided with an avoidance notch below the sliding portion, such that the second end of the synchronous belt connected to the lower-end area of the attachment surface is located below the avoidance notch; the sliding mount is provided with a locking member that is capable of passing through the avoidance notch to fit with the vertical guide track so that the sliding mount is capable of being positioned at different heights on the vertical guide track.

7. The tiering device for a freight compartment as claimed in claim 6, wherein the groove opening is provided with a plurality of vertically spaced snap-in ports on edges of the groove opening; the locking member is hinged on the sliding mount, and the locking member is provided with a protruding snap catch, the snap catch capable of being inserted into any one of the snap-in ports through the avoidance notch to restrict downward movement of the sliding mount, and also capable of being released from the snap-in ports by swing of the locking member.

8. The tiering device for a freight compartment as claimed in claim 4, wherein the sidewall of the freight compartment further comprises a wallboard of the freight compartment; the vertical guide track comprises a first panel which is flush with or approximately flush with an inner surface of the wallboard, and a second panel disposed opposite to the first panel; a first connection plate and a second connection plate provided at intervals along a front-and-rear direction of the freight compartment are connected between the first panel and the second panel; a horizontally disposed mounting shaft penetrates the first connection plate and the second connection plate; the upper synchronous roller is sleeved on the mounting shaft, and the upper synchronous roller is located between the first connection plate and the second connection plate; the mounting shaft is connected with an electric motor capable of driving the mounting shaft to rotate.

9. The tiering device for a freight compartment as claimed in claim 8, wherein the first connection plate and the second connection plate are parallel to each other; a partition plate is connected vertically between the first connection plate and the second connection plate; the partition plate, the second panel, the first connection plate, and the second connection plate together form the belt guide channel; the inner belt body and the outer belt body of the synchronous belt are located on two sides of the partition plate respectively; the groove opening is provided on the first panel and directly opposite to the partition plate.

10. The tiering device for a freight compartment as claimed in claim 1, wherein the vertical guide track is further provided with a roller holder, a pretensioning rod, and a connector inside the vertical guide track, with the lower synchronous roller being rotatably connected on the roller holder; the connector is located below the roller holder, and a position of the connector is fixed in a vertical direction; the pretensioning rod penetrates through both the connector and the roller holder in sequence along the vertical direction; between the pretensioning rod and the connector, there is provided a spring which downwardly pushes and presses the pretensioning rod; an upper end of the pretensioning rod is thread-connected with a screw cap whose lower end face abuts against the roller holder.

11. The tiering device for a freight compartment as claimed in claim 10, wherein the connector comprises a link pin, two vertical side plates disposed opposite to each other, and a top plate joining with top edges of the two vertical side plates; the pretensioning rod is a threaded rod whose head is located below the top plate; the spring is sleeved on a shank portion of the threaded rod, with an upper end of the spring abutting against the top plate while a lower end of the spring abutting against the head of the threaded rod; the link pin penetrates through both lower ends of the two vertical side plates, with two ends of the link pin being inserted into and connected with the vertical guide track respectively.

12. The tiering device for a freight compartment as claimed in claim 8, wherein the electric motor is provided at a top portion of the sidewall of the freight compartment; a drive pulley is sleeved on a rotating shaft of the electric motor, a synchronous pulley is sleeved on the mounting shaft to rotate synchronously with the mounting shaft, and a belt is wound on and between the drive pulley and the synchronous pulley to synchronize rotation of both the drive pulley and the synchronous pulley.

13. The tiering device for a freight compartment as claimed in claim 6, wherein the bottom plate is in an elongated plate shape and vertically disposed, with two vertical edges of the bottom plate being joining with two lateral mounting plates respectively; the locking member is located between the two lateral mounting plates and hinged to the two lateral mounting plates; the support member is a support cross beam, one end of the support cross beam is hinged to the two lateral mounting plates of the sliding mount.

\* \* \* \* \*